(12) United States Patent
Peterson et al.

(10) Patent No.: US 7,779,739 B2
(45) Date of Patent: Aug. 24, 2010

(54) CHOPPER AND SLICER

(75) Inventors: Sarah S. Peterson, Kent, WA (US);
Sascha Kaposi, Tacoma, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 12/118,620

(22) Filed: May 9, 2008

(65) Prior Publication Data
US 2009/0249936 A1 Oct. 8, 2009

Related U.S. Application Data

(60) Provisional application No. 61/042,648, filed on Apr. 4, 2008.

(51) Int. Cl.
*A47J 17/00* (2006.01)
(52) U.S. Cl. .......................... 83/858; 83/932
(58) Field of Classification Search ................... 83/857, 83/858, 932, 856; 99/543, 545
See application file for complete search history.

(56) References Cited

U.S. PATENT DOCUMENTS

| | | | |
|---|---|---|---|
| 113,023 A | 3/1871 | Crawford | |
| 563,652 A * | 7/1896 | Bulette | 83/435.15 |
| 662,588 A | 11/1900 | Bloom | |
| 751,433 A | 2/1904 | Kennedy | |
| 809,952 A | 1/1906 | Hoffa | |
| 928,019 A | 7/1909 | Bartow | |
| 1,504,501 A | 8/1924 | Pope | |
| 1,674,475 A | 6/1928 | Loomis | |
| 2,030,975 A | 2/1936 | Fairchild | |
| 2,309,814 A | 2/1943 | Youngberg | |
| 2,485,877 A | 10/1949 | Hamilton, Jr. | |
| 2,647,549 A * | 8/1953 | Koch | 99/509 |
| 3,077,213 A | 2/1963 | Germano | |
| 3,112,781 A | 12/1963 | Popeil | |
| 3,216,474 A | 11/1965 | Popeil | |
| 3,578,048 A | 5/1971 | Von Duyke | |
| 3,601,249 A | 8/1971 | Larsson | |
| 3,997,072 A | 12/1976 | Guth | |
| 4,059,037 A | 11/1977 | Gerson et al. | |
| 4,062,260 A | 12/1977 | Steinhogl | |
| 4,095,339 A | 6/1978 | Turner | |
| 4,212,431 A | 7/1980 | Doyel | |
| 4,457,070 A | 7/1984 | Reeves | |
| 4,557,053 A | 12/1985 | Hadley, Jr. | |
| 4,572,444 A | 2/1986 | Shadduck | |
| 4,573,384 A | 3/1986 | Jones | |

(Continued)

FOREIGN PATENT DOCUMENTS

DE  29810599  10/1998

(Continued)

*Primary Examiner*—Kenneth E. Peterson
(74) *Attorney, Agent, or Firm*—Black Lowe & Graham, PLLC

(57) ABSTRACT

A food chopper and slicer includes a lower receptacle for holding chopped food items and one or more blades at the top. A pushing element is secured within an outer housing, with the outer housing being configured to snugly and slideably fit around the receptacle. The housing forms a guide path such that the pushing element follows a generally straight and vertical path as it moves downward toward the blades.

15 Claims, 5 Drawing Sheets

U.S. PATENT DOCUMENTS

| | | |
|---|---|---|
| 4,574,479 A | 3/1986 | Gramann |
| 4,670,987 A | 6/1987 | Casey, Jr. |
| 4,759,148 A | 7/1988 | Love |
| 4,805,843 A | 2/1989 | Draper |
| D303,482 S | 9/1989 | Barrault |
| 4,924,575 A | 5/1990 | James |
| 5,098,286 A | 3/1992 | York |
| 5,121,679 A | 6/1992 | Mertz |
| D331,687 S | 12/1992 | Gilbert |
| D335,609 S | 5/1993 | Cesaroni et al. |
| 5,216,031 A | 6/1993 | Dobson et al. |
| 5,245,902 A | 9/1993 | Pereira |
| 5,271,317 A | 12/1993 | Aguerrevere et al. |
| 5,303,472 A | 4/1994 | Mbanugo |
| 5,337,480 A | 8/1994 | Codikow |
| 5,431,078 A * | 7/1995 | Ricard et al. .................. 83/870 |
| 5,499,578 A | 3/1996 | Payne |
| 5,516,038 A | 5/1996 | Zaccarini |
| 5,562,533 A | 10/1996 | Gallagher |
| 5,692,424 A | 12/1997 | Wallace |
| D388,665 S | 1/1998 | So |
| 5,704,485 A | 1/1998 | Cautereels et al. |
| 5,937,525 A | 8/1999 | Chan |
| 5,967,875 A | 10/1999 | Graef |
| 6,047,625 A | 4/2000 | Mendenhall |
| 6,209,439 B1 | 4/2001 | Repac et al. |
| D447,391 S | 9/2001 | Bodum |
| 6,293,445 B1 | 9/2001 | Miller |
| 6,336,552 B1 | 1/2002 | Meier |
| 6,558,244 B1 | 5/2003 | Nedelka |
| 6,601,491 B1 | 8/2003 | Jensen |
| D485,328 S | 1/2004 | Jastrzembski |
| 6,726,266 B2 | 4/2004 | May |
| 6,799,495 B2 | 10/2004 | Jensen |
| 6,802,149 B1 | 10/2004 | Albanese, Jr. et al. |
| 6,805,032 B2 | 10/2004 | Engdahl |
| D499,615 S | 12/2004 | Nordgren |
| 6,923,104 B2 | 8/2005 | Jensen |
| D519,001 S | 4/2006 | So |
| 7,191,691 B2 | 3/2007 | Kaposi |
| D546,638 S | 7/2007 | Kaposi |
| 7,258,292 B2 | 8/2007 | Cheung |
| 7,444,909 B2 * | 11/2008 | Repac et al. .................. 83/167 |
| 2002/0003144 A1 | 1/2002 | Grimes |
| 2003/0051345 A1 | 3/2003 | Louie et al. |
| 2004/0055437 A1 | 3/2004 | Engdahl |

FOREIGN PATENT DOCUMENTS

| | | |
|---|---|---|
| GB | 2286110 | 8/1995 |
| WO | 02064331 | 8/2002 |
| WO | 2005090029 | 9/2005 |
| WO | 2008052492 | 5/2008 |

\* cited by examiner

CHOPPER AND SLICER

PRIORITY CLAIM

This application claims the benefit of prior U.S. Provisional Application Ser. No. 61/042,648, filed Apr. 4, 2008.

FIELD OF THE INVENTION

This invention relates generally to food slicing devices, particularly including devices in which a food item is sliced by urging it through a grid of slicing blades.

BACKGROUND OF THE INVENTION

There are a variety of slicing devices on the market in which a food item such as an onion is sliced by urging it through a tray or grid of slicing blades. In some examples of such devices, a pusher and slicing grid are pivotally movable with respect to one another and brought together to slice the item. In other examples, complicated levers, springs, or gears are involved and these components increase cost and complexity as well as make the device more difficult to clean.

SUMMARY OF THE INVENTION

A preferred example of the invention includes a lower receptacle for holding chopped food items and one or more blades at a top of the receptacle. In one form, the receptacle is an open-topped container configured to hold a grid of blades spanning the open top. A pushing element is secured within an outer housing, with the outer housing being configured to snugly and slideably fit around the receptacle. The housing therefore forms a guide path to keep the path of the pushing element in a generally straight and vertical orientation as it moves axially downward toward the blades.

In some versions of the invention, the grid of blades is removable and can be replaced by one or more different configurations, such as straight, pyramidal, V-shaped, or other blade types.

In some examples of the invention the pushing element is also removable and can be replaced by one or more different configurations that mate closely with corresponding replacement blade configurations.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
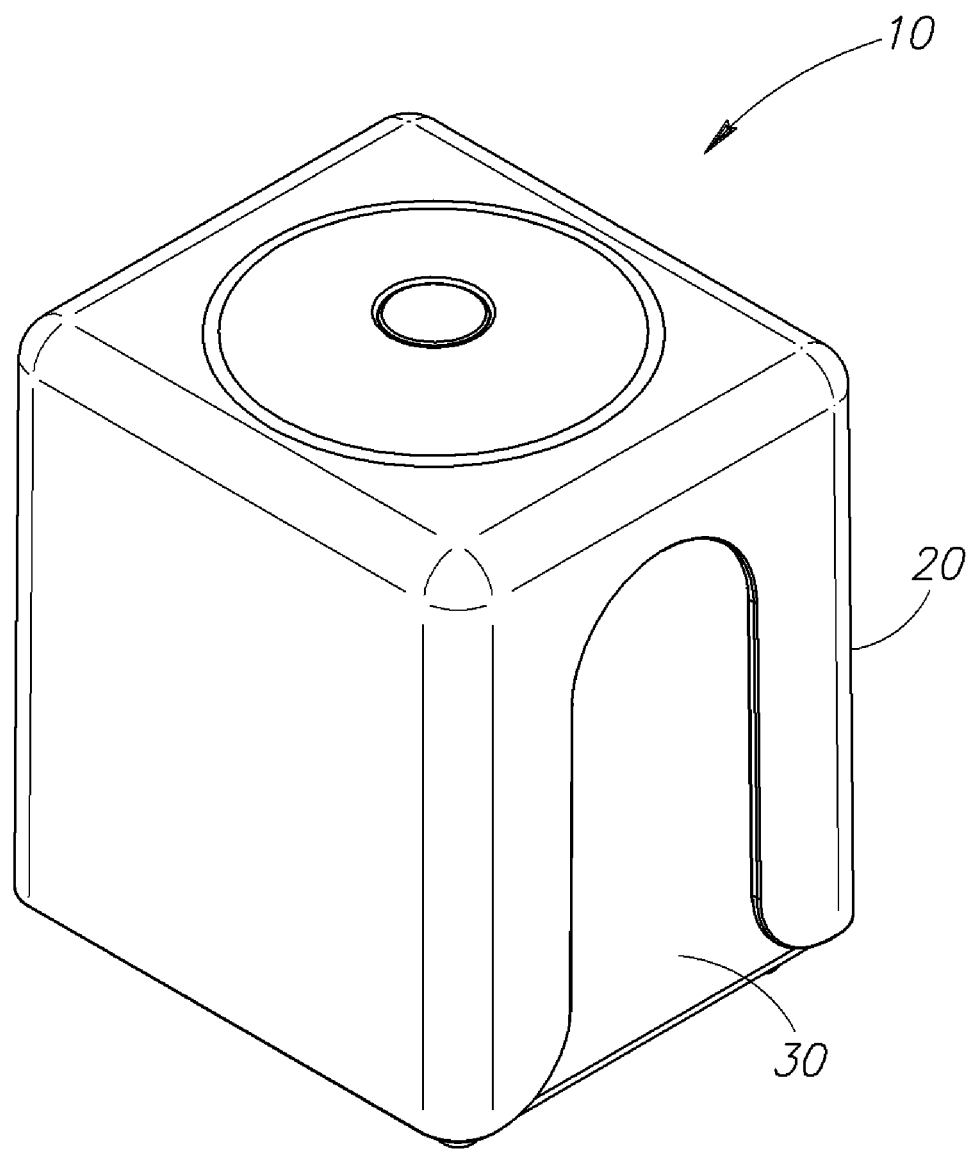
FIG. 1 is a perspective view of a preferred device.

FIG. 1 shows a perspective view of a preferred slicing device 10. As shown, an outer pusher housing 20 surrounds a container 30. In this example of the invention, the container 10 is generally of a rectangular cubic shape, having a base, upwardly extending sidewalls, and an open top (best seen in FIG. 2). The pusher housing 20 is of a mating, complementary shape in that an interior surface of the housing snugly receives an exterior surface of the container so that the housing is able to slide up and down about the container. As shown, the interior of the sidewalls of the housing abut the majority of the exterior of the container and forms a close fit, thereby frictionally engaging the container as the housing slides up and down. In this version the housing and container are not permanently fastened to one another, but rather can be freely separated if the housing is pulled upward from the container a sufficient distance.

In other versions of the invention, other shapes for the housing and container are used. For example, the housing and container may each have a substantially cylindrical shape, formed in a similar mating fashion as discussed above. In other versions the housing need not have an interior surface that substantially abuts the entire exterior surface of the container. Rather, a track or other guide may form the respective surfaces to ensure that the housing follows a path of travel that is generally aligned with an axis extending upward through the center of the container.

In some versions of the invention an upper surface of the housing 20 is bulged upward to accommodate the palm of a user when pushing the housing downward. In other versions the upper surface is flat.

Figure 2:
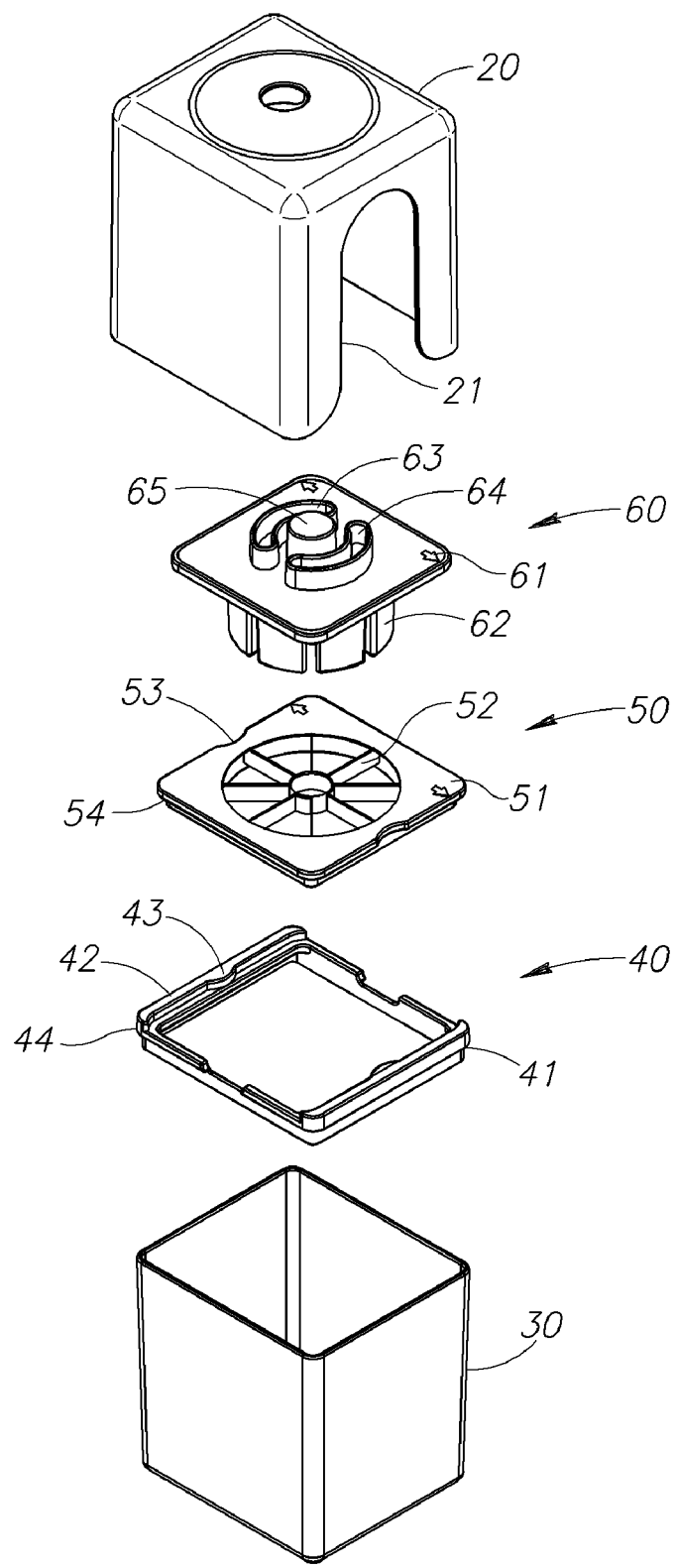
FIG. 2 is an exploded view of a preferred device.

FIG. 2 provides an exploded view of the preferred example of the invention. The container 30 as shown is an open-topped rectangular cubic vessel. Preferably the container is formed from a clear plastic, though other materials may be used.

A frame 40 includes a perimeter that is substantially the same as that of the rim of the open top of the container 30, thereby allowing the frame to be snugly received within the open top of the container. The frame includes a downwardly extending leg and outwardly extending flange forming a shoulder 41 that allows the frame to properly seat on the rim without falling farther into the container. The frame 40 and container 30 are preferably sized and configured such that the frame is frictionally retained within the container. In other versions the frame may be glued or otherwise affixed to the container. Alternatively, the attributes of the frame may be integrally formed with the container.

The frame 40 further includes an upwardly extending peripheral flange 42. In some versions the flange 42 may extend substantially around the perimeter of the frame. In the example shown, however, the flange 42 is formed as a pair of opposing sidewall sections on opposite sides of the frame. On each end of each of the opposing sidewall sections, a lip 44 juts outward toward the opposing sidewall. The sidewall sections extend upward from a horizontal lower portion of the frame to provide a seat that is configured to receive a blade tray 50, discussed further below.

A portion of the frame 40 optionally includes one or more wells 46. As shown, a well is provided on each of the frame sections extending between the opposing upwardly extending sidewalls. The wells facilitate the removal of the blade tray 50 by providing a region in which there is no frame material abutting the blade tray.

An alignment tab 43 is integrally formed in one or both of the upwardly extending flanges 42. As shown, the alignment tab is crescent-shaped and extends from a center portion of the sidewall toward the interior of the frame. A matching alignment tab is formed on the opposite sidewall. In other versions of the invention, the alignment tab can be formed in different shapes and in different locations on the frame.

The blade tray 50 as shown includes an outer perimeter that is sized to fit within the seat defined on the frame. Thus, in the preferred example the blade tray is substantially square in its outer perimeter. The perimeter of the blade tray 50 includes a peripheral flange forming a shoulder 54 that is complementary to the seat defined in the frame so that the blade tray forms a relatively tight frictional fit within the frame.

A recessed region 53 is provided at a peripheral location on the blade tray 50 that is sized and shaped to match that of the tab 43, thereby ensuring that the blade tray is inserted in the proper orientation. Depending on the location of the tab and recessed regions, the blade tray may be configured so that it may only be inserted in a single orientation or, alternatively, in more than one orientation.

The blade tray further includes an open central area having one or more blades 52. As discussed in greater detail below, the blade tray preferably is removable from the frame, thereby allowing the blade tray to be replaced with a different blade tray having a different blade configuration.

An upper surface of the blade tray includes an alignment indicator, which in the example shown is in the form of a pair of arrows 51. The alignment indicator provides a visual indication of the orientation of the blade tray so that a pusher 60 can be readily aligned in the same orientation in the event the orientation is important between the particular blade tray and pusher being used.

The pusher 60 includes one or more downwardly extending projections 62 that are sized and configured to pass between the blades within the blade tray. In the preferred example of the invention, the pusher 60 is removably attached to an upper interior surface of the housing 20. The pusher may be snap-fit, friction-fit, or otherwise attached to the housing in any manner that allows it to be removably retained within the housing. While the pusher is best configured for removable attachment, in some versions of the invention the pusher is either permanently affixed to the housing or is integrally formed within the housing itself.

Figure 5:
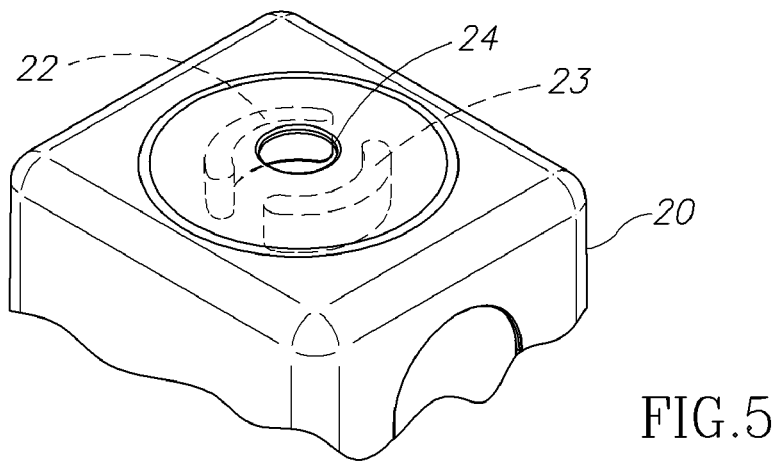
FIG. 5 is perspective cutaway view of a housing in accordance with a preferred device.
Figure 6:
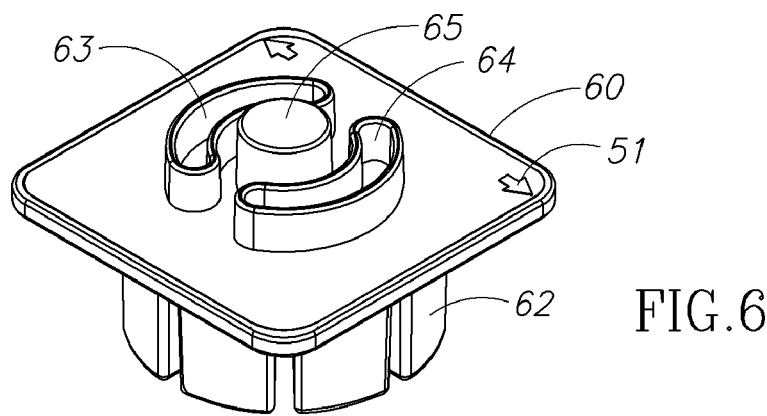
FIG. 6 is a perspective view of a preferred pusher element.

In the configuration as shown, the pusher includes a central pillar 65 extending upward in a direction opposite that of the pusher projections 62, as best seen in FIG. 6. The pillar is surrounded by two supports 63, 64 defining crescent-shaped channels. The interior surface of the housing includes mating structures to retain and secure the pusher within the housing, as best seen in FIG. 5. Thus, a pair of crescent-shaped stems or projections 22, 23 are provided within the housing, extending downward from the upper interior surface, the stems being configured to be received within the channels within the arc-shaped supports 63, 64. Likewise, a cylindrical well 24 is configured in the upper interior surface of the housing to receive the pillar 65. The well may be formed as a circular flange extending downward from the housing, or may alternatively be formed as a bore entirely through the top surface of the housing. In the version incorporating a bore, a portion of the pillar preferably extends through the bore and allows the user to press directly against the pillar of the pusher. In other versions of the invention, a wide variety of other structures are possible to provide snap-fit, frictional, or other engagement between the pusher 60 and the housing 20.

In one example of the invention, the housing 20 is formed from a clear plastic material, allowing the pusher to be visible through the housing. In addition, the clear material makes the alignment arrows 61 visible, helping to ensure that the housing is oriented properly with the alignment arrows 61 of the pusher 60 oriented in the same fashion as the alignment arrows 51 of the blade tray 50.

The housing may optionally include an opening 21 on one or more of its sidewalls. In the example as shown, the opening 21 is a high arch extending along the majority of the length of one of the housing sidewalls. A similar opening is also provided on the opposite sidewall in the preferred version of the invention. In other examples of the invention, an opening may be provided on all four sidewalls or, conversely, no openings may be provided at all. The inclusion of two opposing openings allows the user to have access to the interior of the slicer to adjust a food item with the housing in place, but retains structural rigidity of the housing to ensure proper alignment during use.

Figure 3:
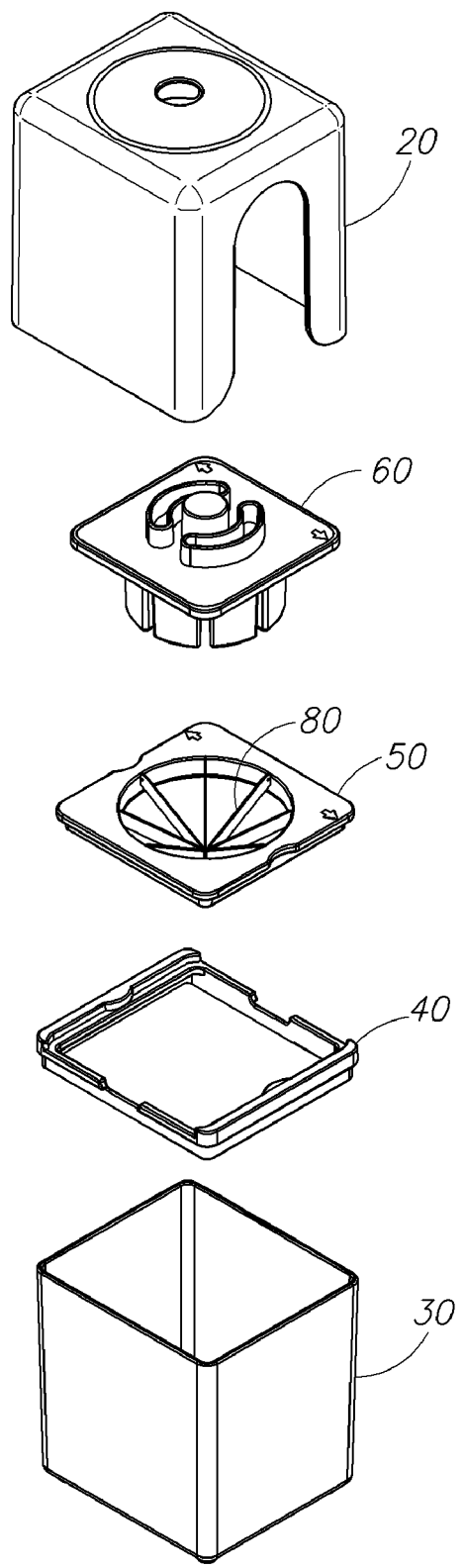
FIG. 3 is an exploded view of an alternate form of a preferred device.

FIG. 3 provides a similar exploded view as in FIG. 2, but with a different blade tray 50. The preferred blade trays are discussed further below.

Figure 4:
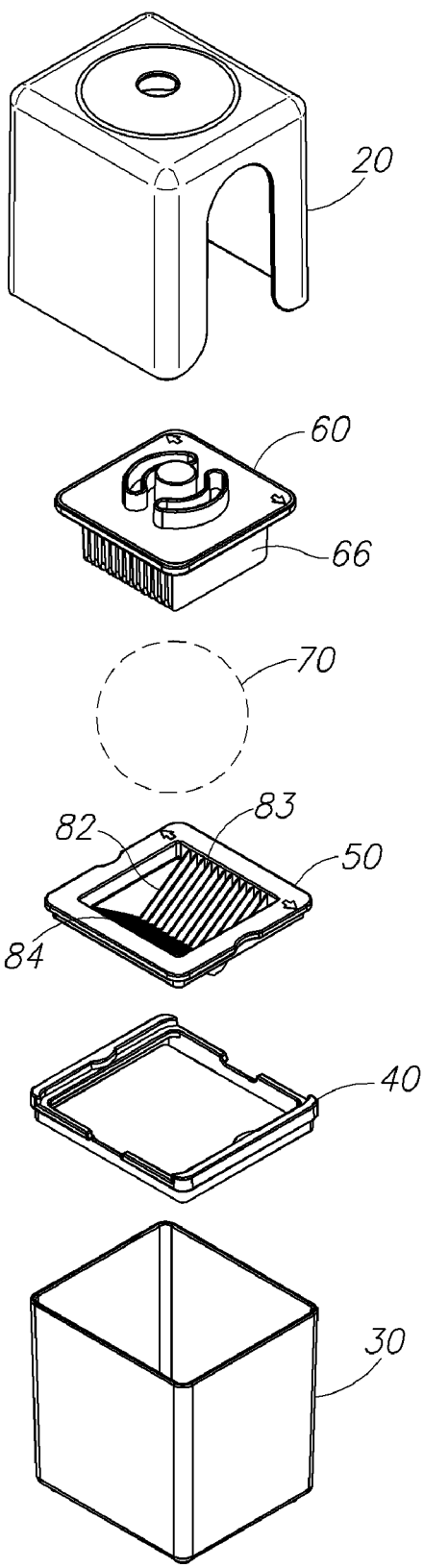
FIG. 4 is an exploded view of an alternate form of a preferred device.

As shown in FIG. 4, the chopper and slicer as described is configured to chop or slice an object such as a food item such as an onion, an apple, or any other item that is desired to be chopped or sliced. Thus, the food item 70 is placed atop the blade tray 50 when it is seated in the frame 50 atop the container 30. The housing 20, having a pusher 60 secured within it, is placed around the container such that the projections of the pusher abut the food item 70. Generally at that point the sidewalls of the container and those of the housing will be frictionally engaged with one another. Pressure is applied to the top of the housing, urging it downward toward the container. The downward pressure likewise pushes the pusher against the food item, forcing it through the blade tray so that the food item is sliced by the blades within the tray. The projections of the pusher are configured to extend through the lower edges of the blades, thereby forcing the food item thoroughly through the blades. The close fit of the housing and the container allow for a smooth and straight path of travel of the pusher toward and through the blades.

The general path of travel of the housing with respect to the container is vertical. Thus, the container defines a central axis that is substantially at the center of the container sidewalls. In the case of a container having straight sidewalls, the central axis is parallel to the sidewalls. The container may be irregular or have angled sides, and in such cases the central axis is preferably in the middle of the sidewalls and extends vertically, orthogonal to the base of the container and substantially at the center of the base of the container. The housing follows a path of travel that is substantially along the central axis, unlike a hinged chopping device.

Because the blade trays and pushers are both removable, they may be replaced with other blade trays and pushers of different configurations. In the version as illustrated in FIG. 2, for example, the blade tray is configured as a corer and slicer. Thus, the blade tray includes a central circular slicing hub blade and eight radially-extending blades 52, each of which is substantially straight. Each of the blades is preferably formed from stainless steel. The mating pusher 60 includes projections 62 such that an individual projection is sized and configured to fit between the openings defined by each of the eight wedges and the central hub. While the corer and slicer blade tray as shown is configured to produce eight slices, alternative versions may have, for example, four or six blades to produce four or six wedge-shaped slices. The pusher for such variations will likewise have a different number of projections sized to mate with the corresponding tray.

In the version of FIG. 3, the blade tray 50 includes a circular blade opening and eight radially projecting blades 80 joined at a first end at the center of the opening and at a second end to the perimeter of the opening. As shown, the blades are angled downward from the perimeter to the center, forming a cone-shaped grid of blades defining eight wedge-shaped openings between the blades. The corresponding pusher 60 (best seen in FIG. 6) likewise has eight projections sided and configured to fit between corresponding openings. In other versions, a conical blade tray may include a different number of blades, for example four or six, and the pusher includes a corresponding number of mating projections.

The blade tray as depicted in FIG. 4 includes a plurality of V-shaped blades 82, each of which includes a first end 83 secured to one side of the blade tray and a second end 84 secured to an opposite side of the tray. The blades are angled downward from each end toward a point generally at the center of the blade, forming a V shape. A top surface of each of the blades is preferably sharpened to facilitate the slicing. Any number of V-shaped blades are provided in the blade tray, longitudinally aligned and spaced to provide slices of a desired width.

Figure 7:
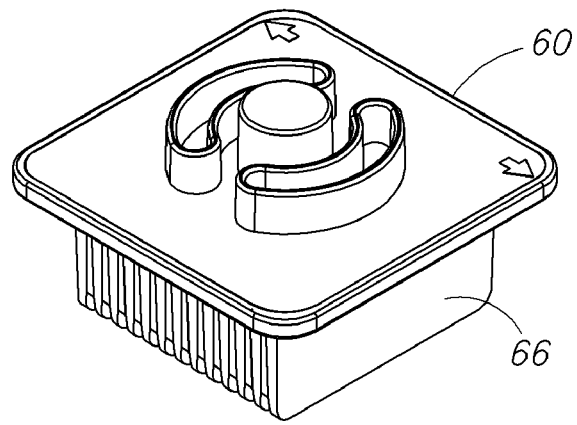
FIG. 7 is a perspective view of an alternate pusher element.

The pusher 60 corresponding to the V-shaped blade is best seen in FIG. 7 and preferably has a plurality of straight, flange-shaped pusher projections 66 sized and configured to fit between the spaces between V-blades. In the preferred form, the projections 66 are generally rectangular in shape, as viewed from the side.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely be reference to the claims that follow.

The invention claimed is:

1. A slicing device, comprising:
   a container having a base and first plurality of sidewalls forming an upper rim, the first plurality of sidewalls defining an interior space and an exterior surface, the container further having a central axis substantially at the center of the sidewalls;
   a blade tray spanning at least a portion of the interior space of the container, the blade tray having a plurality of blades defining a plurality of openings, the blade tray includes a recessed region located on a periphery of the blade tray, the recessed region operable as a complementary keyway to permit orientation of the blade tray relative to the container;
   a housing having a second plurality of sidewalls and a top spanning the second plurality of sidewalls, the second plurality of sidewalls having a complementary shape with respect to the exterior surface of the container, the second plurality of sidewalls defining an interior surface for snugly receiving at least a portion of the exterior surface of the container, the housing slideably movable with respect to the container in a direction substantially along the central axis; and
   a pusher attached to the housing, the pusher having one or more projections sized and shaped to be received within at least one of the plurality of openings defined in the blade tray, said pusher moving with said housing when said housing slides with respect to the container such that a food item placed between said pusher and said blade tray is sliced;
   wherein at least one of the second plurality of sidewalls of the housing has an opening to permit placement of a food item onto the blade tray while all of the second plurality of sidewalls are snugly receiving all of the first plurality of sidewalls of the container and while the pusher is selectively engaged with the housing.

2. The slicing device of claim 1, wherein the plurality of blades further comprise a central hub blade and a plurality of substantially straight blades extending radially from the hub.

3. The slicing device of claim 1, wherein the container forms a rectangular cube.

4. The slicing device of claim 1, wherein the pusher includes engagement members configured to removably secure the pusher to complementary engagement members of the housing.

5. The slicing device of claim 1, wherein the pusher is integrally formed within the housing.

6. The slicing device of claim 1, wherein the blade tray is removably secured to the container.

7. The slicing device of claim 6, further comprising a frame attached to the rim of the container, the frame having an upwardly extending flange defining a seat, wherein the blade tray is retained within the seat.

8. The slicing device of claim 7, wherein the frame further comprises a tab being sized and configured to snugly fit within the recessed region.

9. The slicing device of claim 7, wherein the frame further comprises a well in a portion of the frame, whereby the well forms an open region within the seat to facilitate separation of the blade tray from the frame.

10. The slicing device of claim 7, wherein the housing further comprises at least one projection extending downward from the top and the pusher comprises at least one channel, the projection being sized and configured to be received within the channel to secure the pusher to the housing.

11. The slicing device of claim 10 wherein the projection is crescent shaped.

12. The slicing device of claim 10, wherein the pusher further comprises a pillar and the housing comprises a corresponding well, the pillar being received within the well to secure the pusher to the housing.

13. The slicing device of claim 12, wherein the well further comprises a bore through the top of the housing.

14. The slicing device of claim 10, wherein the pusher further includes an alignment marking.

15. The slicing device of claim 14, wherein the housing is formed from a clear material, whereby the alignment marking is visible through the housing.

* * * * *